June 23, 1970     W. E. BAYBUTT     3,517,107
ELECTRODE ASSEMBLIES
Filed Feb. 29, 1968     3 Sheets-Sheet 1
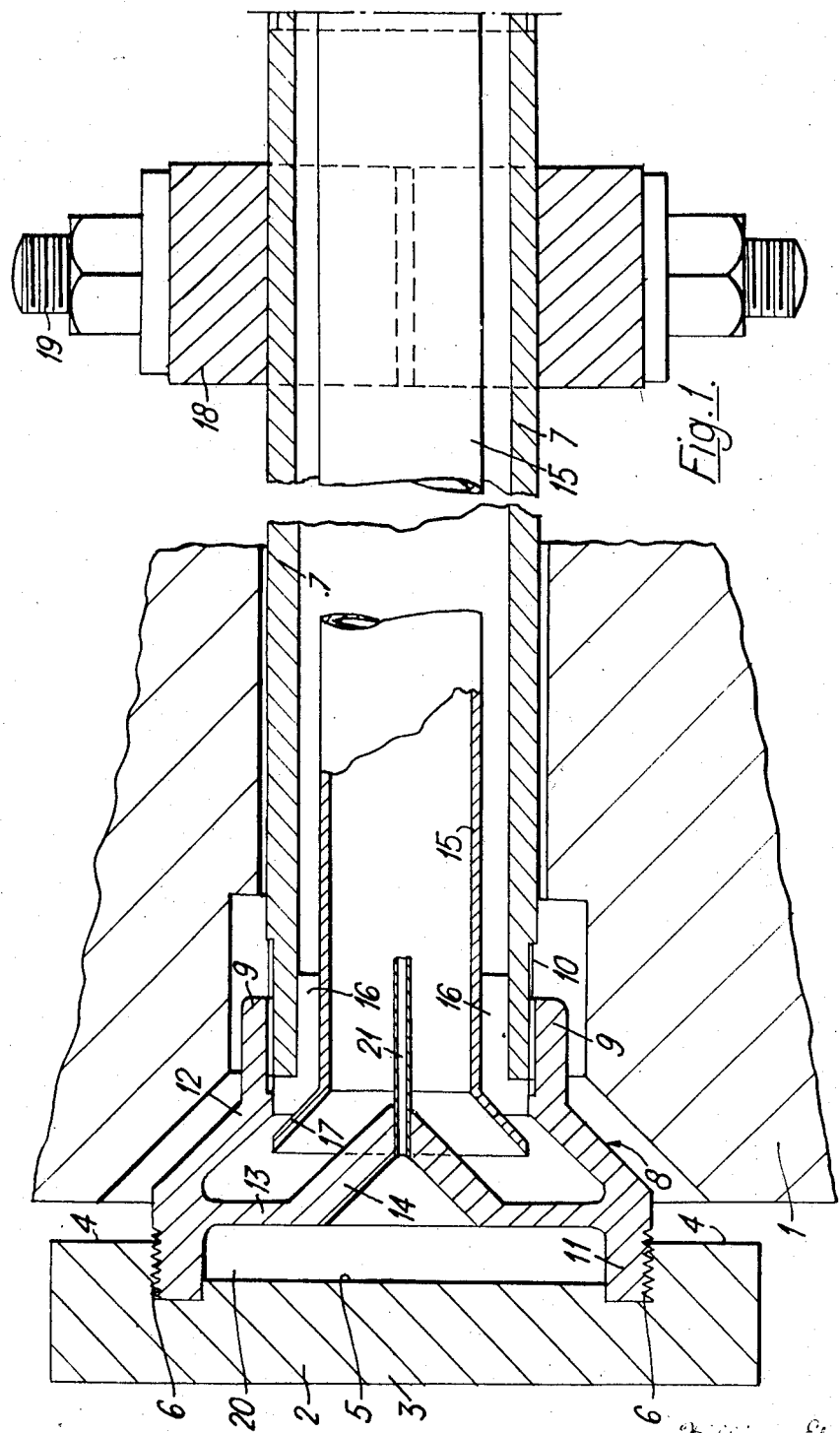
Inventor
William Edward Baybutt
By
Attorney

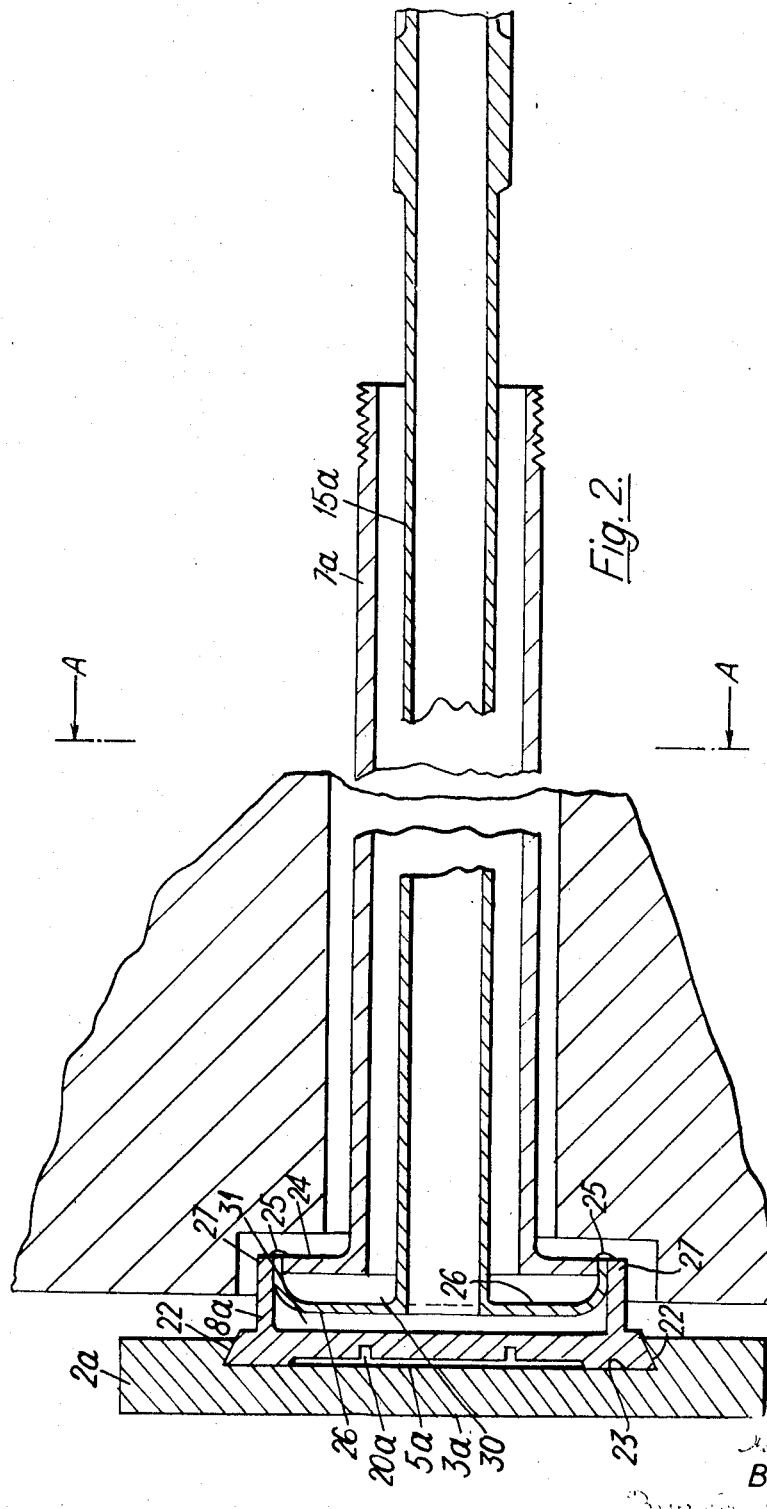

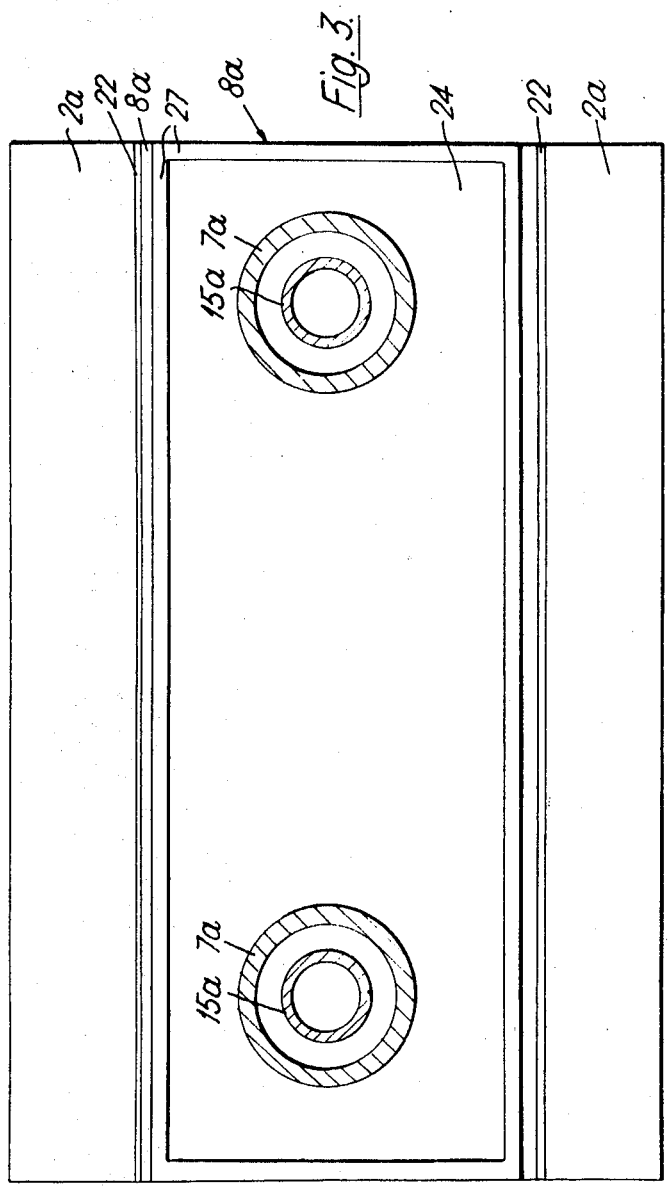

United States Patent Office 3,517,107
Patented June 23, 1970

3,517,107
ELECTRODE ASSEMBLIES
William Edward Baybutt, Lathom, Ormskirk, England, assignor to Pilkington Brothers Limited, Liverpool, England, a corporation of Great Britain
Filed Feb. 29, 1968, Ser. No. 709,317
Claims priority, application Great Britain, Mar. 17, 1967, 12,740/67
Int. Cl. H05b 7/06, 7/10; C03b 5/02
U.S. Cl. 13—18      10 Claims

ABSTRACT OF THE DISCLOSURE

A heat conducting support member is secured to the back of an electrode plate, for use in an electric glass melting furnace, by a heat conducting joint which is nearer to an edge than the centre of the electrode plate.

BACKGROUND OF THE INVENTION

This invention relates to electrode assemblies and more especially to an electrode assembly for use in an electric glass melting furnace.

In electric furnaces for the melting of glass, current is passed through the molten glass between electrodes which project through the furnace structure into the molten glass.

Those parts of the electrode which are in contact with the molten glass are subjected to very arduous operating conditions, and it is the main object of the present invention to provide an electrode assembly construction in which the life of the electrode assembly under these arduous conditions is prolonged.

SUMMARY

According to the present invention an electrode assembly for use in an electric glass melting furnace comprises an electrode plate of refractory metal, a heat conducting support member secured to the back face of the electrode plate by a joint providing a heat conducting path between the support member and the electrode plate, which path is nearer to an edge than to the centre of the electrode plate, and means for circulating cooling fluid through the support member.

This construction has the advantage that the outer margins of the electrode plate, which have been found to be vulnerable to corrosion by the molten glass, are provided with a reasonable degree of cooling while heat is not extracted directly from the centre of the electrode plate, so that there is not an undue extraction of heat from the molten glass through the electrode assembly.

In one preferred embodiment of the invention the support member is secured to the electrode plate by an annular heat conducting joint extending around the back face of the electrode plate near to the edge of the plate. The annular joint may be a screw threaded joint.

The support member may be tubular and closed by an end wall at its operative end, i.e. that end adjoining the electrode plate, an inner tube being fixed within the tubular support so as to direct cooling fluid against the inner face of the end wall, a cavity being defined between the outer face of the end wall and the back face of the electrode plate.

With this construction direct conduction of heat away from the electrode plate is through the heat conducting path provided at the screwed joint, and the cavity between the end wall and the back face of the electrode plate has an insulating function which reduces the extraction of heat from the molten glass through the central region of the electrode plate.

It has further been found that in order to reduce the corrosion of the electrode plate at the high temperatures of molten glass the cavity between the end wall of the support member and the back face of the electrode plate may advantageously be filled with an inert gas. The invention also provides a modified construction in which a conduit enters the cavity through the support member for supplying an inert gas into the cavity. Nitrogen has been found to be particularly suitable as the inert gas.

In an alternative arrangement, the electrode plate is of elongated form, e.g. rectangular, and the operative end of the support member, i.e. that end adjoining the electrode plate, is of similar form and is secured to the electrode plate by a dovetail joint.

In this arrangement, the operative end of the support member may include two separate chambers for circulation of cooling liquid and cooling gas respectively, and two parallel pairs of coaxial tubes are provided, one tube of each pair communicating with one chamber and the other tube of each pair communicating with the other chamber.

BRIEF DESCRIPTION OF THE DRAWINGS

FIG. 1 is a partially sectioned side elevation of an electrode assembly according to the invention, illustrated by way of example, FIG. 2 is a view similar to that of FIG. 1 of a second embodiment of electrode assembly according to the invention, and FIG. 3 is a cross-sectional view of the second embodiment taken on line A—A of FIG. 2.

DESCRIPTION OF THE PREFERRED EMBODIMENT

Referring to FIG. 1 of the drawings, an electrode assembly for use in an electric glass melting furnace is illustrated fixed into a wall 1 of the furnace. In practice the electrode assembly is fixed into the furnace structure either through a wall or through the floor of the furnace and current passes from the electrode assembly through the molten glass to another electrode assembly in contact with the molten glass, thereby heating the molten glass.

The illustrated electrode assembly comprises an electrode plate 2 of circular form. The front face 3 of the electrode plate is flat and the back face 4 is formed with a central recess 5 around whose periphery there runs a threaded annular groove 6, which groove is nearer to the edge than to the centre of plate 2.

The electrode plate 2 is fixed to one end of a heat conducting support member, which includes a straight tube 7 of heat resistant steel which tube extends through the furnace wall 1 to the outside of the furnace and which at its inner end is threaded at 10 to receive a steel end cap indicated generally by the reference number 8. The end cap 8 is formed with a cylindrical collar 9 having an internal thread which screws on to the thread 10 on the end of the tube 7. The other end of the cap 8 is formed with a cylindrical flange 11 having an external thread which screws into the thread in the annular groove 6 in the back face of the electrode plate 2. The cylindrical flange 11 is joined to the collar 9 by a frusto-conical wall 12, and an integral end wall 13 extends across the base of the wall 12 and closes the end of the support member when the end cap 8 is screwed on to the end of the tube 7. The end wall 13 has a central conical projection 14 which points away from the back face 4 of the electrode plate into the interior of the tube 7.

An inner tube 15 is located within the outer tube 7 by locating fins 16 leaving an annular space between the two tubes which permits the circulation of cooling fluid through the support member. At its inner end the tube 15 is outwardly splayed as indicated at 17, this splayed part 17 being of conical form matching the conical shape of the wall 12 of the end cap 8 and the conical projection 14 and being spaced between these two conical parts.

The tubes 7 and 15 project out through the furnace wall 1 and a copper electrical terminal connection 18 is clamped on to the outer end of the tube 7. This clamp 18 is in two parts held on to the tube 7 by bolts 19. Current is conducted along the tube 7 to the end cap 8 and through that end cap to the electrode plate 2. The threading of the electrode plate onto the cylindrical flange 11 of the end cap provides the electrical connection between these parts.

The electrode plate 2 is made of a refractory metal, for example molybdenum, whereas the tube 7 and end cap 8 are made of heat resistant steel, and the differential expansion between these two parts ensures that when the electrode plate is immersed in molten glass the plate is tightly secured on to the end of the support member thereby ensuring good electrical contact as well as good heat conduction from the electrode plate 2 through the joint between the electrode plate and the flange 11 on the end cap 8.

Cooling fluid, for example water, is circulated through the support member by supplying the fluid through the inner tube 15. Because of the shape of the splayed end 17 of the tube 15 there is a strong flow of the cooling fluid against the inner face of the end wall 13 and the cooling fluid discharges through the space between the tubes 7 and 15.

In this way the main heat extraction from the electrode plate 2 is through the heat conducting path provided by the annular joint 6. Since the heat conducting path between the support member and the electrode plate is nearer the edge than the centre of the electrode plate 2, this ensures as much cooling as possible for the outer edges of the electrode plate while avoiding the extraction of too much heat from the molten glass in the region of the electrode assembly.

The heat extraction from the molten glass is further controlled by the provision of a cavity 20 between the end wall 13 of the support member within the flange 11, and the recess 5 in the back face 4 of the electrode plate. This cavity 20 provides an insulating buffer to limit the extraction of heat from the central part of the electrode plate. An inert gas, for example nitrogen, may be maintained in the cavity. Means for supplying the inert gas are provided by a duct 21 extending co-axially through the projection 14 and through the tubes 7 and 15 to an inert gas supply connection outside the furnace structure.

The presence of the inert gas in the cavity 20 against the back face of the electrode plate helps to reduce corrosion of the back of the electrode plate at the high temperature of operation of the furnace.

Another embodiment of the invention is illustrated in FIGS. 2 and 3 in which the electrode plate 2a is of rectangular shape and is secured to an end cap 8a of the support member by a longitudinal dovetail joint indicated at 22, the joint being made by sliding the plate 2a on to the support member. The differential expansion between the steel of the end cap 8a and the molybdenum from which the electrode plate 2a is formed results in tightening of the dovetail joint when the electrode assembly is at the high temperature of molten glass. Each part of the dovetail joint 22 provides a heat conducting path which is nearer to an edge of the plate 2a than to the centre thereof.

Heat conduction for cooling the marginal regions of the electrode plate is through the heat conducting paths provided by the dovetail joint. The outer face 23 of the end cap 8a of the support member is recessed to form a cavity 20a between the back face 5a of the electrode plate and the end cap.

As shown in FIGS. 2 and 3, two parallel outer tubes 7a have their ends fixed within holes spaced apart along the length of the rectangular plate 24. Two inner tubes 15a which extend coaxially within tubes 7a have their ends similarly fixed within holes in a rectangular copper partition 26. The partition 26 has a rearwardly curved flange which engages around the perimeter of plate 24, and which also engages within a flange 27 extending rearwardly from the perimeter of the cap 8a. The edges of the plate 24, the partition 26, and the flange 27, are brazed together at joint 25. The partition 26 internally separates the operative end of the support member into two chambers 30 and 31.

In operation, cooling fluid such as water is circulated through one tube 7a into the chamber 30, and leaves this chamber by way of the other tube 7a. A cooling gas is circulated through chamber 31 in like manner by means of the two tubes 15a. This arrangement therefore allows for a high rate of cooling to be effected at the joints 22, while milder cooling is effected in the central area of the support member.

In the embodiment shown, the cavity 20a is open at both ends. However the recess in the face 23 of the end cap 8a may alternatively not extend to the ends of the cap, in which case the cavity 20a may be closed at its ends. In this latter case, inert gas can be supplied to this cavity in a manner similar to that described with reference to FIG. 1.

In this construction the heat conduction away from the electrode plate through the dovetail joint occurs through heat conducting paths which are nearer to the edges than the centre of the electrode plate, resulting in prolonged life of the electrode plate and in particular in reduced wear on the corners of the rectangular electrode plate.

The cooling provided by the flow of cooling fluid through the support member which cooling is accompanied by heat extraction from the region of the edges of the electrode plate reduces wear of the electrode plate in use, and has been found to greatly prolong the life of electrode plates in a glass melting furnace.

I claim:

1. An electrode assembly for use in an electric glass melting furnace, comprising an electrode plate of refractory metal, a heat conducting support member having a forward end secured to the back face of the electrode plate and in surface contact with said back face, every point on the internal periphery of said contacting surfaces being nearer to an edge than to the centre of the electrode plate, and means for circulating cooling fluid through the support member.

2. An electrode assembly according to claim 1, wherein the support member is tubular and is closed by an end wall at its forward end, a tube is fixed within the tubular support so as to direct cooling fluid against the inner face of the end wall, and a cavity is defined between the outer face of the end wall and the back face of the electrode plate.

3. An electrode assembly according to claim 2, including a conduit extending through the support member and communicating with said cavity for supplying an inert gas into said cavity.

4. An electrode assembly according to claim 1, wherein the electrode plate and the forward end of the support member are of elongated form, e.g. rectangular, and are secured together by a dove tail joint.

5. An electrode assembly according to claim 4, wherein partition means are housed in the support member and define two separate chambers, extending parallel to the back face of the electrode plate, and two parallel pairs of coaxial tubes are provided within the support member one tube of each pair communicating with one chamber for circulation of cooling liquid therethrough and the other tube of each pair communicating with the other chamber for circulation of cooling gas therethrough.

6. An electrode assembly according to claim 1, wherein the support member and the electrode plate define a cavity therebetween, said cavity being bounded by said contacting surfaces.

7. An electrode assembly according to claim 6, wherein said cavity is circular and wherein an annular wall of said support member is threaded into a socket in said back face of the electrode plate.

8. An electrode assembly according to claim 1, wherein the support member and the electrode plate are formed of materials having different coefficients of expansion whereby on heating of the assembly the electrode plate becomes more firmly secured to the support member.

9. An electrode assembly for use in an electric glass melting furnace, comprising an electrode plate of refractory metal having a back face which has a circular recess defined by an internally threaded wall, a heat conducting support member having an externally threaded forward end in screw-thread engagement with the internally threaded wall of the electrode plate, the support member being tubular and being closed by an end wall spaced from the base of said recess in the back face of the electrode plate to define a cavity therebetween, every point on the peripheral wall of the cavity being nearer to an edge than the centre of the electrode plate, a tube extending through the tubular support member for directing cooling fluid against the inner face of said end wall, and a conduit extending through the support member and communicating with said cavity for supplying an inert gas into said cavity.

10. An electrode assembly for use in an electric glass melting furnace, comprising a rectangular electrode plate of refractory metal having a recess of elongated form in its back face, a heat conducting support member having a forward end secured in the recess in the back face of the electrode plate by a dovetail joint, the support member being tubular and being closed by the end wall that is itself recessed a define a cavity between the outer face of the end wall of the support member and the base of the recess in the back face of the electrode plate, every point on the peripheral wall of the cavity being nearer to an edge than the centre of the electrode plate, partition means housed in the support member and defining two separate chambers extending parallel to the back face of the electrode plate, and two parallel pairs of coaxial tubes within the support member, one tube of each pair communicating with one chamber for circulation of cooling liquid therethrough and the outer tube of each pair communicating with the other chamber for circulation of cooling gas therethrough.

References Cited

UNITED STATES PATENTS

| | | | |
|---|---|---|---|
| 961,139 | 6/1910 | Keller | 13—18 X |
| 2,209,515 | 7/1940 | Ehman et al. | 13—6 |
| 2,599,179 | 6/1952 | Hopkins | 13—18 |
| 3,148,239 | 9/1964 | Pinotti | 13—6 |
| 3,388,204 | 6/1968 | Ellis | 13—18 |

H. B. GILSON, Primary Examiner

U.S. Cl. X.R.

13—6